US009461963B2

(12) United States Patent
Fang

(10) Patent No.: US 9,461,963 B2
(45) Date of Patent: Oct. 4, 2016

(54) SYSTEMS AND METHODS FOR DETECTING UNDESIRABLE NETWORK TRAFFIC CONTENT

(71) Applicant: Fortinet, Inc., Sunnyvale, CA (US)

(72) Inventor: Michael Yu Fang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 14/282,614

(22) Filed: May 20, 2014

(65) Prior Publication Data

US 2014/0259142 A1 Sep. 11, 2014

Related U.S. Application Data

(63) Continuation of application No. 11/212,205, filed on Aug. 24, 2005, now Pat. No. 8,769,663.

(51) Int. Cl.
*H04L 29/06* (2006.01)
*G06F 21/56* (2013.01)

(52) U.S. Cl.
CPC .............. *H04L 63/02* (2013.01); *G06F 21/565* (2013.01); *H04L 63/107* (2013.01); *H04L 63/1416* (2013.01); *G06F 2221/2115* (2013.01)

(58) Field of Classification Search
CPC .............. H04L 63/02; H04L 63/0227; H04L 63/0245; H04L 63/0254; H04L 63/12; H04L 63/123; H04L 63/14; H04L 63/1408; H04L 63/1416; H04L 63/1441; H04L 63/145; H04L 63/1466; H04L 63/1483; H04L 63/30; H04L 63/306; G06F 21/50; G06F 21/55; G06F 21/56; G06F 21/562; G06F 21/564; G06F 21/565; G06F 21/566; G06F 21/567; G06F 2221/2115; G06F 2221/2125; G06F 2221/2139
See application file for complete search history.

(56) References Cited

U.S. PATENT DOCUMENTS

| | | | | |
|---|---|---|---|---|
| 6,487,666 | B1 * | 11/2002 | Shanklin | G06F 21/55 709/224 |
| 7,383,580 | B1 * | 6/2008 | Frentz | G06F 21/564 709/206 |
| 7,952,888 | B2 * | 5/2011 | Yamaguchi | H01L 21/6835 361/765 |
| 2002/0042886 | A1 | 4/2002 | Lahti | |
| 2004/0030927 | A1 | 2/2004 | Zuk | |
| 2004/0143713 | A1 * | 7/2004 | Niles | G06F 11/1453 711/162 |
| 2004/0205356 | A1 | 10/2004 | Maida-Smith | |
| 2004/0237079 | A1 * | 11/2004 | Cox | G06F 8/65 717/168 |
| 2005/0005163 | A1 | 1/2005 | Kirkpatrick | |
| 2006/0059400 | A1 | 3/2006 | Clark | |
| 2007/0079379 | A1 | 4/2007 | Sprosts | |
| 2008/0235799 | A1 | 9/2008 | Julisch | |
| 2009/0019547 | A1 * | 1/2009 | Palliyil | G06F 21/566 726/25 |

(Continued)

*Primary Examiner* — Eric W Shepperd
(74) *Attorney, Agent, or Firm* — Law Office of Dorian Cartwright

(57) ABSTRACT

A method of detecting a content desired to be detected includes receiving electronic data at a first host, determining a checksum value using the received electronic data, sending the checksum value to a processing station, the processing station being a second host that is different from the first host, and receiving a result from the processing station, the result indicating whether the electronic data is associated with a content desired to be detected. A method of detecting a content desired to be detected includes receiving electronic data at a receiving station, and determining whether the received electronic data is associated with a content desired to be detected, wherein the receiving station does not include content detection data for identifying the content desired to be detected.

10 Claims, 4 Drawing Sheets

(56) References Cited

U.S. PATENT DOCUMENTS

2010/0226383 A1 9/2010 Cothrell
2014/0052976 A1* 2/2014 Marino .................. G06F 21/56
 713/2

* cited by examiner

SYSTEMS AND METHODS FOR DETECTING UNDESIRABLE NETWORK TRAFFIC CONTENT

RELATED APPLICATION DATA

This application is a Continuation of U.S. application Ser. No. 11/212,205, filed on Aug. 24, 2005, to which priority is claimed and which is incorporated herein by reference in its entirety.

BACKGROUND

1. Field

The field of the application relates to computer network and computer systems, and more particularly, to systems and methods for detecting electronic content in a computer network or computer system.

2. Background

The generation and spreading of computer viruses are major problems in computer systems and computer networks. A computer virus is a program that is capable of attaching to other programs or sets of computer instructions, replicating itself, and/or performing unsolicited or malicious actions on a computer system. Viruses may be embedded in email attachments, files downloaded from Internet, and macros in MS Office files. The damage that can be done by a computer virus may range from mild interference with a program, such as a display of unsolicited messages or graphics, to complete destruction of data on a user's hard drive or server.

To provide protection from viruses, most organizations have installed virus scanning software on computers in their network. However, these organizations may still be vulnerable to a virus attack until every host in their network has received updated anti-virus software. With new attacks reported almost weekly, organizations are constantly exposed to virus attacks, and spend significant resources ensuring that all hosts are constantly updated with new anti-virus information. For example, with existing content detection software, a user may have to request for a download of a new virus signature in order to enable the content detection software to detect new virus that has been created since the last update. If a user delays in downloading the new virus signature, the content detection software would be unable to detect the new virus. Also, with existing content detection systems, new virus signatures are generally not made available shortly after they are discovered. As such, a computer may be subjected to attack by the new virus until the new virus signature is available and is downloaded by a user.

Besides virus attacks, many organizations also face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, the most popular solution for blocking unwanted web activity is to block access to a list of banned or blacklisted web sites and pages based on their URLs. However, as with virus scanning, the list of blocked URL requires constant updating. If a user delays in downloading the list of URL, or if the list of URL is not made available soon enough, the content detection software would be unable to detect undesirable content, such as web pages.

Many email spam elimination systems also use blacklists (spammer lists) to eliminate unwanted email messages. These systems match incoming email messages against a list of mail servers that have been pre-identified to be spam hosts, and prevent user access of messages from these servers. However, as with virus scanning, the spammer list also requires constant updating. If a user delays in downloading the spammer list, or if the spammer list is not made available soon enough, the content detection software would be unable to detect undesirable content.

Another problem with existing content detection software is that the downloading procedure that is required to update virus signatures, blocked URL list, and spammer list, may take a long time, and may consume a significant amount of resources at the local computer in which the content detection software is installed. Also, detecting undesirable content by using the local computer to process the downloaded detection information (e.g., virus signatures, blocked URLs, spammer identifications) may use up a significant amount of resources at the local computer, thereby degrading the performance of the local computer. For example, while the local computer is performing a process to detect a virus, a user of the local computer may experience a decrease in processing speed of the local computer when using the local computer to perform another task, such as, word processing, computer-aided drawing, or web surfing.

Accordingly, improved systems and methods for detecting content of computer and network traffic would be useful.

SUMMARY

In accordance with some embodiments, a method of detecting a content desired to be detected includes receiving electronic data at a first host, determining a checksum value using the received electronic data, sending the checksum value to a processing station, the processing station being a second host that is different from the first host, and receiving a result from the processing station, the result indicating whether the electronic data is associated with a content desired to be detected.

In accordance with other embodiments, a computer-program product having a medium, the medium having a set of instructions readable by a processor, wherein an execution of the instructions by the processor causes a process to be performed, the process includes receiving network traffic data at a first host, determining a checksum value using the received network traffic data, sending the checksum value to a processing station, the processing station being a second host that is different from the first host, and receiving a result from the processing station, the result indicating whether the electronic data is associated with a content desired to be detected.

In accordance with other embodiments, a system for detecting a content desired to be detected includes a processor configured for receiving network traffic data, and determining a checksum value using the received network traffic data, the processor being associated with a first host, and a data transmitting and receiving device for sending the checksum value to a processing station, and receiving a result from the processing station, the result indicating whether the electronic data is associated with a content desired to be detected, wherein the processing station is a second host that is different from the first host.

In accordance with other embodiments, a method of detecting a content desired to be detected includes receiving electronic data at a receiving station, and determining whether the received electronic data is associated with a content desired to be detected, wherein the receiving station does not include content detection data for identifying the content desired to be detected.

In accordance with other embodiments, a computer-program product having a medium, the medium having a set of instructions readable by a processor, wherein an execution of the instructions by the processor causes a process to be performed, the process includes receiving electronic data at a receiving station, and determining whether the received electronic data is associated with a content desired to be detected, wherein the receiving station does not include content detection data for identifying the content desired to be detected.

In accordance with other embodiments, a system for detecting a content desired to be detected includes a receiving station for receiving network traffic data, and a data transmitting and receiving device for receiving a result indicating whether the received electronic data is associated with a content desired to be detected, wherein the receiving station does not include content detection data for identifying the content desired to be detected.

In accordance with other embodiments, a method of detecting a content desired to be detected includes receiving a checksum value at a first host, comparing the checksum value with a reference checksum value, determining a result indicating whether the electronic data is associated with a content desired to be detected based on the comparing, and sending the result to a receiving station, the receiving station being a second host that is different from the first host.

In accordance with other embodiments, a computer-program product having a medium, the medium having a set of instructions readable by a processor, wherein an execution of the instructions by the processor causes a process to be performed, the process includes receiving a checksum value at a first host, comparing the checksum value with a reference checksum value, determining a result indicating whether the electronic data is associated with a content desired to be detected based on the comparing, and sending the result to a receiving station, the receiving station being a second host that is different from the first host.

In accordance with other embodiments, a system for detecting a content desired to be detected includes a processing station having a data transmitting and receiving device for receiving a checksum value, the checksum value generated using network traffic data, wherein the processing station is configured to compare the checksum value with a reference checksum value, and determine a result indicating whether the electronic data is associated with a content desired to be detected based on the comparing, and the processing station is further configured to cause the data transmitting and receiving device to send the result to a receiving station, wherein the processing station and the receiving station are different hosts.

Other aspects and features of the embodiments will be evident from reading the following description of the embodiments.

BRIEF DESCRIPTION OF THE DRAWINGS

The drawings illustrate the design and utility of embodiments of the application, in which similar elements are referred to by common reference numerals. In order to better appreciate how advantages and objects of various embodiments are obtained, a more particular description of the embodiments are illustrated in the accompanying drawings. Understanding that these drawings depict only typical embodiments of the application and are not therefore to be considered limiting its scope, the embodiments will be described and explained with additional specificity and detail through the use of the accompanying drawings.

DETAILED DESCRIPTION

Figure 1:
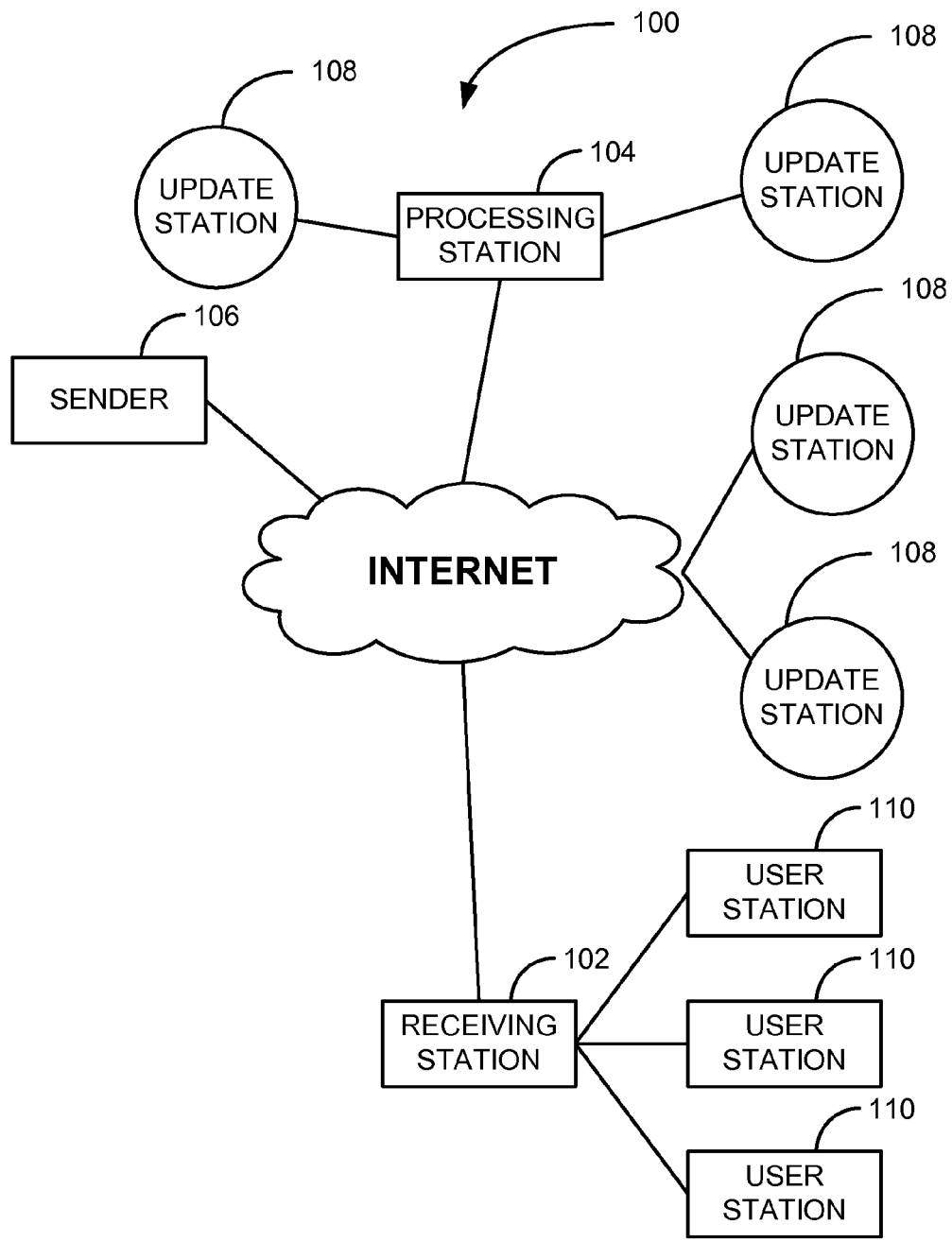
FIG. 1 illustrates a block diagram of a content detection system having a receiving station and a processing station in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments. They are not intended as an exhaustive description of the invention or as a limitation on the scope of the invention. In addition, an illustrated embodiment may not show all aspects or advantages. An aspect or an advantage described in conjunction with a particular embodiment is not necessarily limited to that embodiment and can be practiced in any other embodiments, even if not so illustrated or described.

FIG. 1 illustrates a block diagram of a content detection system 100 in accordance with some embodiments. The content detection system 100 includes a receiving station 102 for receiving electronic data, and a processing station 104 for determining a result indicating whether the electronic data is associated with a content desired to be detected. As used in this specification, the term "receiving station" refers to a device/program that can receive electronic data. For example, the receiving station 102 can be a computer, a server, a module, a firewall, a computer program, or any one of a variety of devices that can receive and transmit information (e.g., a handheld device). Also, as used in this specification, the term "electronic data" or "electronic content" refers to data that can be transmitted between two computers, between a computer and a device (e.g., a diskette), or between two devices (e.g., firewalls). As shown in the figure, the processing station 104 is communicatively connected to the receiving station 102 through the internet, e.g., via a LAN line or a wireless device. The processing station 104 and the receiving station 102 are separate hosts in a TCP/IP network, with their unique IP addresses, respectively.

In the illustrated embodiments, the content detection system 100 also includes a plurality of user stations 110 connected to the receiving station 102. In such cases, the receiving station 102 is responsible for receiving electronic data and passing the electronic data to one of the user stations 110 to which the electronic data is intended. In other embodiments, the content detection system 100 does not include the user stations 110. In such cases, the receiving station 102 functions as a user station.

In the illustrated embodiments, the content detection system 100 further includes a plurality of update stations 108 for supplying the processing station 104 information regarding content that is, or may be, desired to be detected. The update stations 108 may be communicatively connected to the processing station 104 locally (e.g., via a cable line)

and/or through the internet (e.g., via a LAN line). In other embodiments, the content detection system 100 can include more than one processing station 104, each of which is configured to serve certain receiving stations 102 in different geographical areas. In such cases, each update station 108 can be assigned to update one or more processing station 104 with information regarding content that is desired to be detected. In other embodiments, the content detection system 100 does not include the update stations 108. In such cases, the processing station 104 also functions as the update station.

In the illustrated embodiments, the processing station 104 is a computer. Alternatively, processing station 104 can be a server, a module, a device, or any one of a variety of devices that can receive and transmit information, such as a handheld device. In some embodiments, at least a portion of the processing station 104 can be implemented using hardware. For example, in some embodiments, the processing station 104 includes an application-specific integrated circuit (ASIC), such as a semi-custom ASIC processor or a programmable ASIC processor. In other embodiments, the processing station 104 can be any of a variety of circuits or devices capable of performing the functions described herein. For example, in alternative embodiments, the processing station 104 can include a general purpose processor, such as a Pentium processor. In other embodiments, the processing station 104 can be implemented using software that is loaded onto a computer, a server, or other types of memory, such as a disk or a CD-ROM. In further embodiments, the processing station 104 can be implemented as web applications. In still further embodiments, the processing station 104 can be implemented using a combination of software and hardware. In other embodiments, the processing station 104 can be a component of a gateway (e.g., a firewall), or a separate component that is coupled to a gateway. In other embodiments, the processing station 104 can be a gateway product by itself.

In the illustrated embodiments, the processing station 104 is configured (e.g., designed and/or programmed) to determine whether electronic data received at the receiving station 102 is associated with a content desired to be detected, based on content detection data (e.g., a virus signature, a spammer identification, a URL, or a spy-ware program identification) that it receives. In some embodiments, the content detection data is transmitted from one of the update stations 108 in response to the processing station 104's request to download such content detection data. For example, the processing station 104 can be configured to periodically download updated content detection data from one or more of the update stations 108 (as in a "PULL" technology). In other embodiments, the update station(s) 108 is configured to transmit content detection data to the processing station 104 not in response to a request from the processing station 104 (as in a "PUSH" technology). In further embodiments, the content detection data can be input into processing station 104 by a user of the processing station 104. In some embodiments, the processing station 104 also receives subscriber data, such as a user identification of a receiving station 102, level of protection desired by the user of the receiving station 102, from the receiving station 102 or from the update station(s) 108.

In some embodiments, if the system 100 includes a plurality of processing stations 104, the processing stations 104 are configured to coordinate among themselves to ensure that all processing stations 104 are provided with the content detection data. For example, two processing stations 104 can be configured to communicate with each other for various purposes, such as, to check a load demand on one of the processing stations 104, to check a capacity of one of the processing stations 104, to check an availability of one of the processing stations 104, and/or to verify that one of the processing stations 104 has received content detection data. In some embodiments, based on the load demand and/or the capacities on the processing stations 104, the processing stations 104 share the load among themselves (e.g., by dividing the load in equal parts, or by distributing the load based on respective ratios of the demand and/or capacities on the processing stations 104) to respond to queries from different receiving stations 102. In some embodiments, one or more processing station(s) 104 can be configured to serve as backup for another processing station 104.

The update station 108 is configured to provide content detection data to the processing station 104. For example, a user of the update station 108 may input the content detection data into the update station 108, and sends the content detection data to the processing station 104 from the update station 108. In other embodiments, the update station 108 may download the content detection data from another update station 108 periodically (as in a "PULL" technology). In further embodiments, the update station 108 may receive the content detection data from another update station 108 without requesting such content detection data (as in a "PUSH" technology). In some embodiments, each of the update stations 108 is located at a geographical location that is different from others. For example, an update station 108 may be located at a different building, a different street, a different city, or a different country, from another update station 108. In the illustrated embodiments, each update station 108 is a computer, but alternatively, can be a server, a module, a device, a computer program, and the like, e.g., any one of a variety of devices that can receive and transmit information. Although five update stations 108 are shown, in other embodiments, content detection system 100 can include more or less than five update stations 108. In some embodiments, the update station(s) 108 also receives subscriber data, such as a user identification of a receiving station 102, level of protection desired by the user of the receiving station 102, and forward the subscriber data to the processing station 104 for processing. In other embodiments, the processing station 104 and the update station 108 are combined and implemented as a single unit (e.g., processor).

Figure 2:
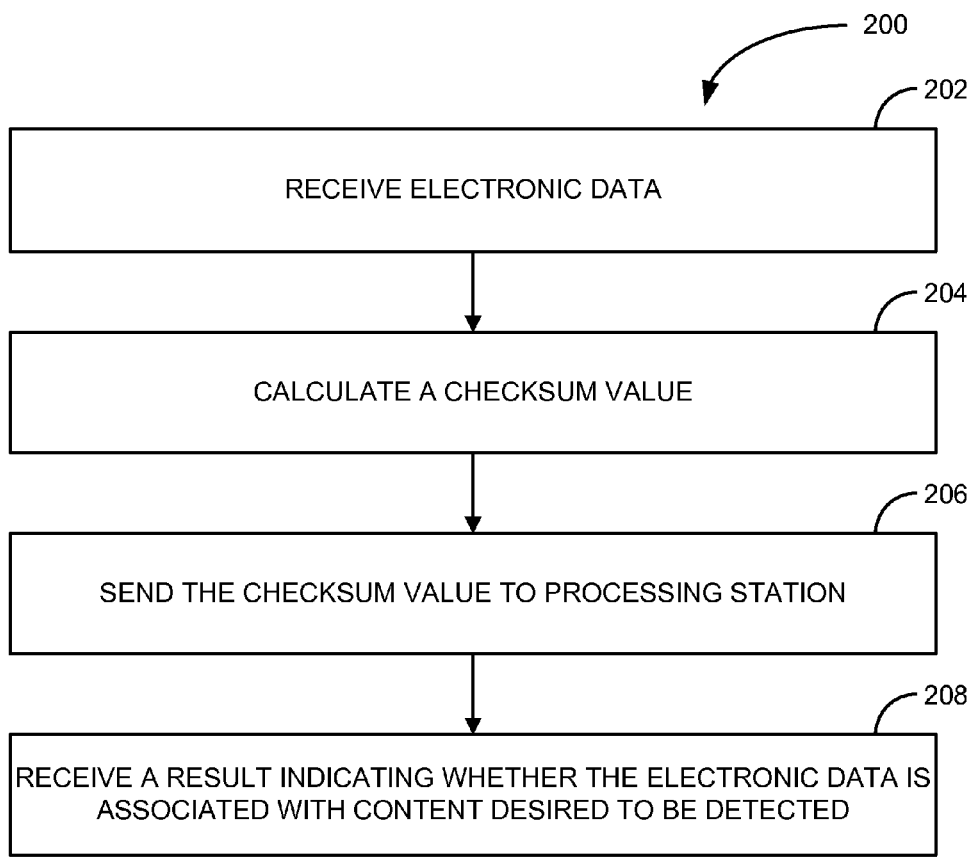
FIG. 2 illustrates a method performed by the receiving station of FIG. 1 in accordance with some embodiments.

Having described the components of the content detection system 100, a method 200 of using the content detection system 100 to detect a content desired to be detected in accordance with some embodiments will now be described with reference to FIG. 2. First, the receiving station 102 receives electronic data (step 202). By means of non-limiting examples, such electronic data can be that associated with a web page, an email, an email attachment, a word file, a program, or any file that may contain content desired to be detected (e.g., a virus, a spam, a worm, a spy-ware, or any of other undesirable content). The receiving station 102 can receive the electronic data from any of a variety of sources. For example, the receiving station 102 can receive the electronic data from the sender 106 who sends the electronic data to the receiving station 102 through the internet. Alternatively, the receiving station 102 can receive electronic data by a person, who inputs the electronic data into the receiving station 102, e.g., by loading the electronic data into the receiving station 102 using a disk, a CD ROM, a memory, and the like.

After the receiving station 102 received the electronic content, the receiving station 102 then calculates a checksum value using the received electronic data (step 204). By means of non-limiting examples, the receiving station 102 can be configured to calculate a checksum value for the received data using cyclic redundancy check 32 (CRC32), secure hash algorithm 1 (SHA1), Message-Digest algorithm 5 (MD5), or any of other techniques known in the art. Techniques for calculating checksum values are well known in the art, and therefore, will not be described in further details.

Next, the receiving station 102 sends the checksum value to the processing station 104 through the internet (e.g., through TCP/IP network) (step 206).

The processing station 104 receives the checksum value, and processes the checksum value to determine whether the electronic data received by the receiving station 102 is associated with content desired to be detected. For example, the processing station 104 may determine, based on its processing of the checksum value, that the electronic data received by the receiving station 102 is not associated with a content desired to be detected. In such cases, the processing station 104 then generates a result indicating that the electronic data is not associated with content desired to be detected, and transmits such result to the receiving station 102. Alternatively, the processing station 104 may determine, based on its processing of the checksum value, that the electronic data received by the receiving station 102 is associated with a content desired to be detected. For example, the processing station 104 may determine that the received electronic data by the receiving station 102 is a spy-ware program, or a part of a spy-ware program. In such cases, the processing station 104 then generates a result indicating that the electronic data is associated with content desired to be detected, and transmits such result to the receiving station 102. Embodiments of methods performed by the processing station 104 will be described in detail below.

The receiving station 102 next receives a result from the processing station 104 (step 208). In the illustrated embodiments, the result indicates whether the electronic data is associated with a content desired to be detected. In such cases, the receiving station 102 may perform one or more of a variety of actions based on such result it receives from the processing station 104. In some embodiments, if the result from the processing station 104 indicates that the received electronic data is not associated with content desired to be detected (e.g., the result indicating that the received electronic data is associated with a spy-ware), the receiving station 102 may reject the electronic data, may prevent the electronic data from being sent downstream, or may send a warning message downstream (e.g., to the station 110 to which the electronic data is intended to be transmitted—if the station 110 is available).

In some embodiments, the processing station 104 determines whether the checksum value it receives from the receiving station 102 matches with a reference checksum value. In such cases, the processing station 104 sends a result to the receiving station 102, informing the receiving station 102 whether a match for the checksum value has been found (which, in turn, indicates whether the received electronic data received by the receiving station 102 is associated with content desired to be detected). The receiving station 102 then determines whether the electronic data it received is associated with content desired to be detected based on the result. For example, if no match is found by the processing station 104, the receiving station 102 may determine that the electronic data is not associated with a content desired to be detected. In such cases, the receiving station 102 may accept the electronic data or pass it downstream to the station 110 (if one is available). Alternatively, if a result from the processing station 104 indicates that a match is found, the receiving station 102 may determine that the electronic data it received is associated with a content desired to be detected. In such cases, the receiving station 102 may reject the electronic data, may prevent the electronic data from being sent downstream, or may send a warning message downstream (e.g., to the station 110 to which the electronic data is intended to be transmitted—if the station 110 is available).

In the illustrated embodiments, the receiving station 102 is configured to calculate checksum values for certain prescribed quantities of electronic data it receives, and transmits such checksum values to the processing station 104. For example, in some embodiments, the receiving station 102 can be configured to calculate a checksum value for every 10 kilobytes of electronic data it receives. In such cases, the receiving station 102 will calculate a first checksum value CS1 for the first 10 kilobytes of electronic data it receives (in step 204), and will send such checksum value CS1 to the processing station 104 (in step 206). The first 10 kilobytes may be a part of a program, for example. The processing station 104 may find a reference checksum value (an example of content detection data) that matches the checksum value CS1. If this is the case, the receiving station 102 then receives a result from the processing station 104 indicating that the received electronic data is associated with content desired to be detected. Alternatively, the processing station 104 may not find a reference checksum value that matches the checksum value CS1. In such cases, the processing station 104 then sends a result to the receiving station 102 indicating that no match is found. The receiving station 102 next calculates a second checksum value CS2 using the first 20 kilobytes of electronic data it receives (in step 204), and sends the second checksum value CS2 to the processing station 104. The processing station 104 then determines whether the second checksum value CS2 matches with a reference checksum value. The above process continues until the receiving station 102 receives no more electronic data (e.g., reaches an end of a transmission session), until the received electronic data reaches a prescribed quantity (e.g., 500 kilobytes), or until the processing station 104 determines that there is a match between the checksum value and a reference checksum value.

In some embodiments, after the processing station 104 finds a first match between a checksum value and a reference checksum value, the receiving station 102 continues to generate additional checksum value(s) (step 204) and send additional checksum value(s) to the processing station 104 (step 206). Such is performed until the processing station 104 finds a second match between another checksum value and another reference checksum value. Such technique may be desirable in cases which require two checksum values to uniquely identify content desired to be detected.

Figure 3:
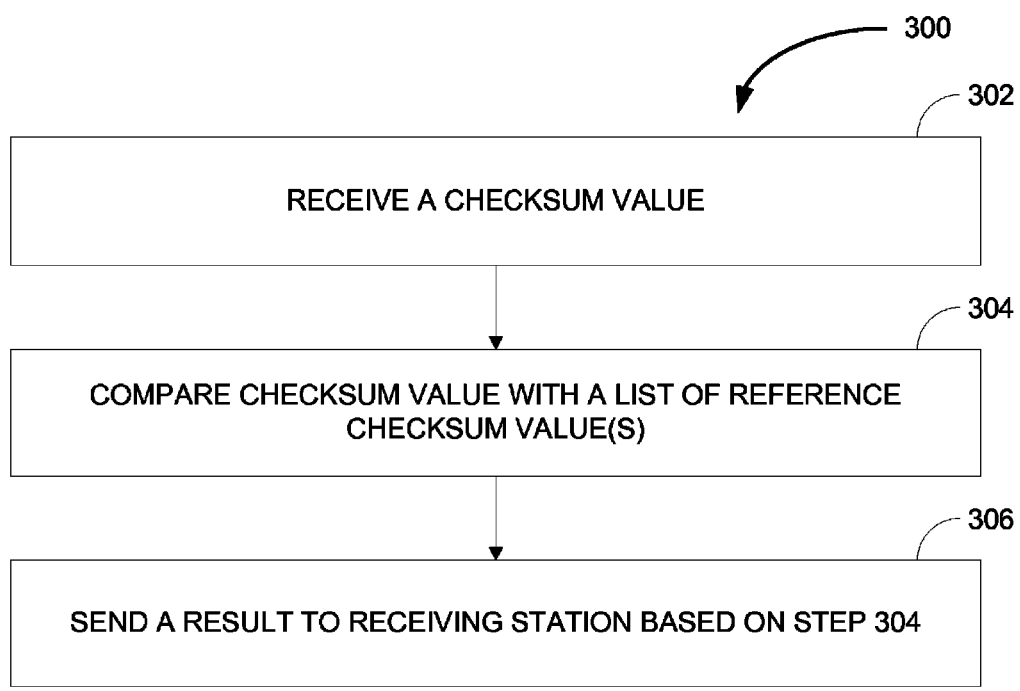
FIG. 3 illustrates a method performed by the processing station of FIG. 1 in accordance with some embodiments.

FIG. 3 illustrates a method 300 of detecting content desired to be detected, which is performed by the processing station 104 of FIG. 1 in accordance with some embodiments. First, the processing station 104 receives information regarding electronic data received by the receiving station 102 (step 302). In particular, step 302 is performed in response to step 206 performed by the receiving station 102. In the illustrated embodiments, the information regarding electronic data is a checksum value that is calculated by the receiving station 102, as discussed previously. In other embodiments, the information can be other data, such as a header, a packet length, protocol information, port number, protocol commands, or any information that can assist the processing station 104 in identifying content desired to be detected. In some embodiments, the processing station 104 services a plurality of receiving station 102, and maintains a list of all receiving stations 102 that it services. In such cases, when a query is received from the receiving station 102, the processing station 104 also determines whether the receiving station 102 is a legitimate subscriber by checking its identity against a list of subscribers.

Next, the processing station 104 processes the information it receives from the receiving station 102 (step 304). In the illustrated embodiments, the processing station 104 compares a checksum value it receives from the receiving station 102 against a list of reference checksum value(s) to determine if a match can be found. Each of the reference checksum value(s) represents a signature of a program desired to be detected, such as a spy-ware. In other embodiments, each reference checksum value can represent a worm, a virus, a malicious program, a malicious exploit attack, a known email fraud, or malicious website. In some embodiments, the reference checksum value(s) can be inputted into the processing station 104 by a person, such as an administrator. In other embodiments, the reference checksum value(s) can be transmitted from one or more update stations 108 to the processing station 104.

Next, the processing station 104 sends a result to the processing station 102 based on the step 304 (step 306). The receiving station 102 receives the result from the processing station 104 in step 208 of method 200. In some embodiments, if the checksum value matches a reference checksum value, the processing station 104 then sends a result to the receiving station 102 indicating that the electronic data is associated with content desired to be detected (such as a virus, a worm, a spy-ware, etc.). In some cases, the processing station 104 or the receiving station 102 may also tear down a network connection to prevent a malicious network attack or a dangerous network transmission. On the other hand, if the checksum value does not match any of the reference checksum value(s), the processing station 104 then sends a result to the receiving station 102 indicating that the electronic data is not associated with content desired to be detected.

In some embodiments, after the processing station 104 determines a first match between a checksum value and a reference checksum value, it continues to receive additional checksum value(s) from the receiving station 102 (step 302). Such is performed until the processing station 104 finds a second match between another checksum value and another reference checksum value. Such technique may be desirable in cases which require two checksum values to uniquely identify content desired to be detected, as discussed previously.

As illustrated in the above embodiments, by storing the content detection data (e.g., reference checksum value(s)) at the processing station 104, and using the processing station 104 to analyze information regarding electronic data received by the receiving station, the receiving station 102 can determine whether received electronic data is associated with content desired to be detected without maintaining content detection data. As a result, more memory, storage, and/or processing time can be preserved for allowing the receiving station 102 to perform other tasks. The content detection system 100 is also advantageous because the receiving station 102 is not required to periodically download content detection data, which can consume much time, and may interrupt the operation of the receiving station 102. Also, with the content detection system 100, the responsibility to keep up with the latest security update (e.g., content detection data) is shifted from users of the receiving station 102 (or stations 110) to the processing station 104 and/or the update station(s) 108. In addition, unlike typical update method, which requires the receiving station 102 to regularly "poll" an update station to check if there is a new update, in the "PUSH" technique embodiments, the latest security update data (content detection data) are made available to the processing station 104 within minutes (or even seconds) after they are identified. This allows the processing station 104 to be updated in substantially real time, and is advantageous because some content detection data such as virus definitions are very time-sensitive, and should be made available to the receiving station 102 as soon as the content detection data are available. This method also has the advantage of faster response time during an outbreak and less resource consumption on the receiving station 102.

In the above embodiments, the receiving station 102 has been described with reference to generating a checksum value, and the processing station 104 has been described with reference to generating a result based on a matching between a checksum value and a reference checksum value. In other embodiments, the processing station 104 can utilize any of other types of information in its processing. For example, in other embodiments, the content detection data used by the processing station 104 is a virus signature, in which case, the processing station 104 utilizes the virus signature to generate a result indicating whether the electronic data received by the receiving station 102 is associated with a virus desired to be detected. In other embodiments, the content detection data used by the processing station 104 is a spammer identification, in which case, the processing station 104 utilizes the spammer identification to generate a result indicating whether the electronic data received by the receiving station 102 is associated with a spam desired to be detected.

Computer Architecture

As described previously, any of the receiving station 102, the processing station 104, and the update station 108, can be implemented using a computer. For example, one or more instructions can be imported into a computer to enable the computer to perform any of the functions described herein.

Figure 4:
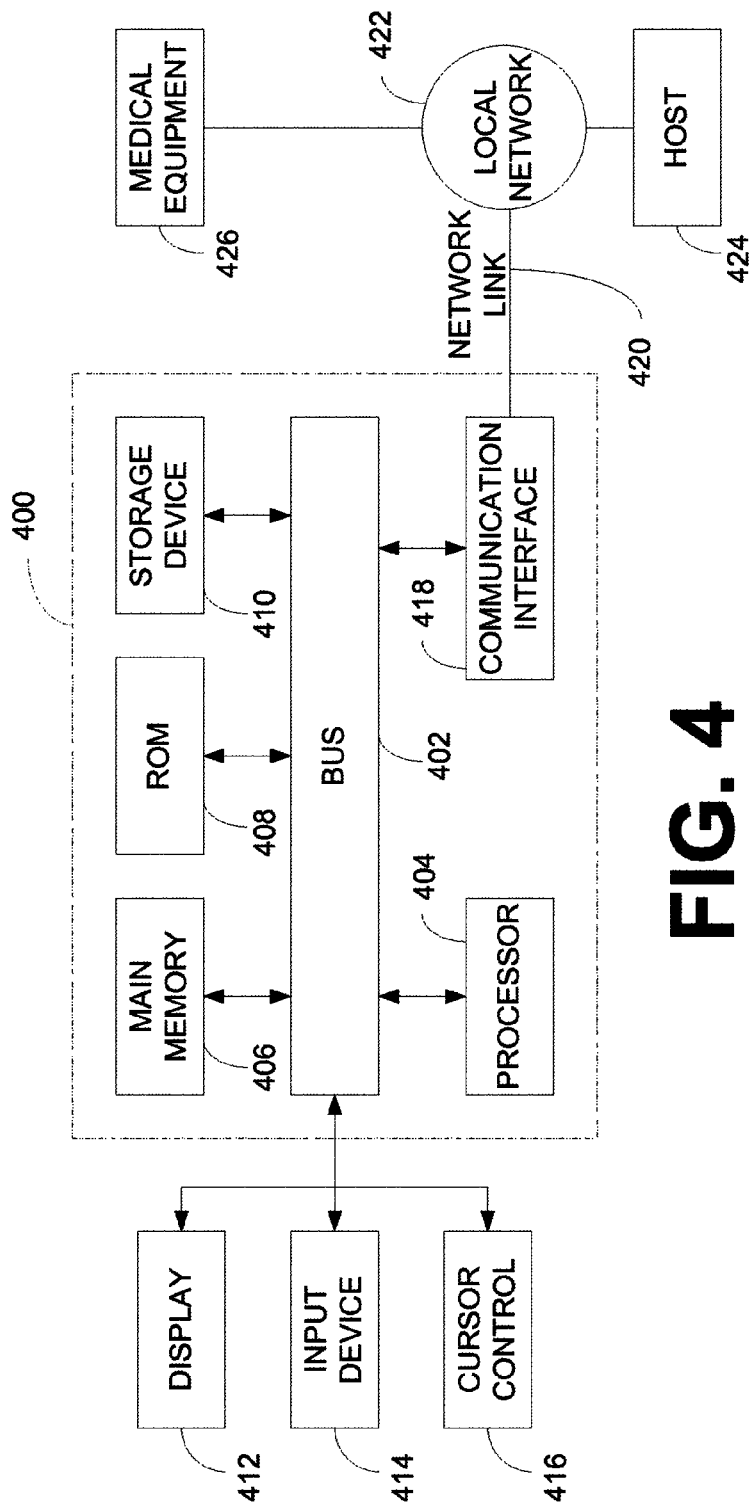
FIG. 4 illustrates a diagram of a computer hardware system that can be used to perform various functions described herein in accordance with some embodiments.

FIG. 4 is a block diagram that illustrates an embodiment of a computer system 400 upon which embodiments of the receiving station 102, the processing station 104, or the update station 108 may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 may further include a read only memory (ROM) 408 or other static storage device(s) coupled to bus 402 for storing static information and instructions for processor 404. A data storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a user. An input device 414, including alphanumeric and other keys, is coupled to bus 402 for communicating information and command selections to processor 404. Another type of user input device is cursor control 416, such as a mouse, a trackball, cursor direction keys, or the like, for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Embodiments described herein are related to the use of computer system 400 for transmitting, receiving, and/or processing electronic data. According to some embodiments, such use may be provided by computer system 400 in response to processor 404 executing one or more sequences of one or more instructions contained in the main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement various operations/functions described herein. Thus, embodiments are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry data streams representing various types of information.

Network link 420 typically provides data communication through one or more networks to other devices. For example, network link 420 may provide a connection through local network 422 to a host computer 424. Network link 420 may also transmits data between an equipment 426 and communication interface 418. The data streams transported over the network link 420 can comprise electrical, electromagnetic or optical signals. The signals through the various networks and the signals on network link 420 and through communication interface 418, which carry data to and from computer system 400, are exemplary forms of carrier waves transporting the information. Computer system 400 can send messages and receive data, including program code, through the network(s), network link 420, and communication interface 418. Although one network link 420 is shown, in alternative embodiments, communication interface 418 can provide coupling to a plurality of network links, each of which connected to one or more local networks. In some embodiments, computer system 400 may receive data from one network, and transmit the data to another network. Computer system 400 may process and/or modify the data before transmitting it to another network.

Although particular embodiments have been shown and described, it will be understood that it is not intended to limit the present inventions to the embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A non-transitory device-readable medium, with instructions stored thereon, which when executed by at least one processor of a processing station device of a plurality of processing stations geographically disbursed, cause the processing station device to:
   receive, via a network connection by a network interface device of the processing station device, updates to information regarding electronic data desired to be detected, the information stored in a memory device of the processing station device;
   receive, via the network interface device of the processing station device according to a geographical location of at least one of the processing station device and a receiving station device, a representation of at least a portion of electronic data from the receiving station device, the representation of the at least a portion of electronic data generated by the receiving station device according to a hashing algorithm, wherein the processing station device does not store electronic data desired to be detected and wherein the representation has a smaller data size than the at least a portion of electronic data;

compare the representation of the at least a portion of electronic data to a list of reference representations of electronic data desired to be detected, the list of reference representations of electronic data desired to be detected stored in the memory device;

generate, when the comparing identifies a match of the representation to a member of the list of reference representations of electronic data desired to be detected, a message indicating the electronic data from which the representation was generated is associated with content desired to be detected; and transmitting, via the network interface device of the processing station device, the message to the receiving station device, wherein content desired to be detected is prevented by the receiving station device from being sent to a user device.

2. The non-transitory device-readable medium of claim 1, wherein the content desired to be detected includes a malicious data processing element.

3. The non-transitory device-readable medium of claim 2, wherein the malicious data processing element includes at least one data element of a malicious exploit attack.

4. The non-transitory device-readable medium of claim 1, wherein the representation of the received portion of the electronic data is a checksum value calculated on the receiving station device according to a checksum calculation function.

5. The non-transitory device-readable medium of claim 1, wherein the processing station device is a firewall device.

6. A processing station device of a plurality of processing stations geographically disbursed, the processing station device comprising:
   at least one processor;
   at least one memory device;
   at least one network interface device;
   instructions, stored in the at least one memory device and executable by the at least one processor to:
      receive, via a network connection by a network interface device of the processing station device, updates to information regarding electronic data desired to be detected, the information stored in a memory device of the processing station device;

receive, by the at least one network interface device, according to a geographical location of at least one of the processing station device and a receiving station device, a representation of at least a portion of electronic data from the receiving station device, the representation of the at least a portion of electronic data generated by the receiving station device according to a hashing algorithm, wherein the processing station device does not store electronic data desired to be detected and wherein the representation has a smaller data size than the at least a portion of electronic data;

compare the representation of the at least a portion of electronic data to a list of reference representations of electronic data desired to be detected, the list of reference representations of electronic data desired to be detected stored in the at least one memory device;

generate, when the comparing identifies a match of the representation to a member of the list of reference representations of electronic data desired to be detected, a message indicating the electronic data from which the representation was generated is associated with content desired to be detected; and transmitting, via the at least one network interface device, the message to the receiving station device, wherein content desired to be detected is prevented by the receiving station device from being sent to a user device.

7. The device of claim 6, wherein the content desired to be detected includes a malicious data processing element.

8. The device of claim 7, wherein the malicious data processing element includes at least one data element of a malicious exploit attack.

9. The device of claim 6, wherein the representation of the received portion of the electronic data is a checksum value calculated on the receiving station device according to a checksum calculation function.

10. The device of claim 6, wherein the processing station device is a firewall device.

\* \* \* \* \*